(12) United States Patent
Toriumi et al.

(10) Patent No.: US 7,445,557 B2
(45) Date of Patent: Nov. 4, 2008

(54) CONSTANT VELOCITY JOINT BOOT

(75) Inventors: Mayuki Toriumi, Aichi-ken (JP); Yoshiaki Mase, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 279 days.

(21) Appl. No.: 11/370,943

(22) Filed: Mar. 9, 2006

(65) Prior Publication Data

US 2006/0205523 A1 Sep. 14, 2006

(30) Foreign Application Priority Data

Mar. 14, 2005 (JP) ............................. 2005-071639

(51) Int. Cl.
*F16D 3/84* (2006.01)
(52) U.S. Cl. .................................... 464/175
(58) Field of Classification Search ......... 464/173–175; 277/634–636; 403/50, 51
See application file for complete search history.

(56) References Cited

U.S. PATENT DOCUMENTS

| 4,211,423 | A | * | 7/1980 | Resech ....................... 277/636 |
| 4,718,680 | A | * | 1/1988 | Halconruy et al. ...... 464/175 X |
| 5,311,912 | A | * | 5/1994 | Hayward ................ 464/175 X |
| 2006/0066062 | A1 | * | 3/2006 | Sugiyama .................. 277/635 |

FOREIGN PATENT DOCUMENTS

| FR | 2 414 144 | * | 9/1979 | ................. 464/175 |
| JP | A-2002-295509 | | 10/2002 | |
| JP | A-2003-301856 | | 10/2003 | |
| JP | A-2003-329136 | | 11/2003 | |
| JP | A-2005-106294 | | 4/2005 | |

OTHER PUBLICATIONS

Chinese Office Action issued on Jun. 8, 2007 in corresponding Chinese patent application No. 200610065739.6 (and English translation).

* cited by examiner

*Primary Examiner*—Greg Binda
(74) *Attorney, Agent, or Firm*—Posz Law Group, PLC

(57) ABSTRACT

A smaller cylindrical portion having a clamp groove formed on an outer peripheral surface thereof has a cylindrical surface portion which extends straight in an axial direction, an inclined surface portion which extends, while being inclined, radially outwardly from an end portion of the cylindrical surface portion and a vertical wall surface portion which extends straight radially outwardly from an end portion of the inclined surface portion, the cylindrical surface portion, the inclined surface portion and the vertical wall surface portion being formed continuously sequentially in that order from a side wall surface of the clamp groove. A stress concentration on a specific location on the smaller cylindrical portion can be suppressed by virtue of the stress alleviating action of these cylindrical surface portion, the inclined surface portion and the vertical wall surface portion.

3 Claims, 3 Drawing Sheets

CONSTANT VELOCITY JOINT BOOT

BACKGROUND OF THE INVENTION

1. Field of the Invention

The present invention relates to a constant velocity joint boot and more particularly to a constant velocity joint boot which is placed to cover a constant velocity joint which is inevitable as a drive shaft joint for a front-wheel-drive vehicle.

2. Related Art

A joint portion of a constant velocity joint is covered by a bellows-shaped boot in which grease is sealed so as to prevent the intrusion of water and dust to thereby maintain smooth rotation at large angles. This constant velocity joint boot is made up of a larger cylindrical portion which is fastened to a joint outer race or the like, a smaller cylindrical portion that smaller in diameter than the larger cylindrical portion and which is fastened to a shaft and a bellows portion having substantially the shape of a frustum of triangular pyramid which connects the larger cylindrical portion and the smaller cylindrical portion together. Then, when in use, since the bellows portion deforms as an angle formed between the joint outer race or the like and the shaft (a joint angle) varies, even in the event that the angle increases, the joint portion can be sealed off by the boot in an ensured fashion.

Incidentally, in the event that the joint angles decreases and the bellows portion rotates at a small angle such as on the order of 20 degrees or smaller, there sometimes occurs a case where a stress exerted on the small cylindrical portion substantially equals a stress exerted on a root portion of the bellows portion. As this occurs, there sometimes occurs a risk that an early crack is generated in the smaller cylindrical portion at a portion thereof which lies near a boundary with the bellows portion. Note that when a bending angle of the bellows portion is large, a larger stress is exerted on the larger cylindrical portion than on the smaller cylindrical portion, whereby a crack is generated in the bellows portion. Due to this, there has been desired a constant velocity joint boot having such a durability that the generation of a crack in the smaller cylindrical portion can be suppressed, even in the event that the bellows portion bends at the small angle of on the order of 20 degrees or smaller.

Then, JP-A-2003-329136 discloses a technique which suppresses the generation of a crack in the smaller cylindrical portion at the portion thereof which lies near the boundary with the bellows portion.

In this technique, as shown in FIG. 7, a shoulder portion 93 of a clamp groove (a groove on which a fastening member is fitted) 91 formed on an outer peripheral surface of a small cylindrical portion 90 which lies to face a bellows portion 92 is cut away along the full circumference thereof, whereby a circumferentially extending cut-away portion 94 is formed on the shoulder portion 93. Then, it is mentioned in the technique that since the volume of the shoulder portion 93 can e reduced by virtue of the existence of the cut-away portion 94 like this, a stress exerted on an end portion of the clamp groove 91 which lies to face the bellows portion 92 can be relaxed, the durability of a boot can be increased.

Even with the aforesaid conventional constant velocity joint boot, however, the generation of a crack in the smaller cylindrical portion due to the stress exerted when the bellows portion bends at small angles cannot necessarily be suppressed in a sufficient manner.

SUMMARY OF THE INVENTION

The invention was made in view of the situations described above, and a technical problem that the invention is to solve is to provide a constant velocity joint boot which can effectively suppress the generation of a crack in the smaller cylindrical portion due to a stress exerted when the bellows portion bends at small angles.

With a view to solving the problem, according to the invention, there is provided a constant velocity joint boot comprising:

a smaller cylindrical portion attachable to a shaft, which has a clamp groove formed on an outer peripheral surface thereof on which a fastening member is fitted, a larger cylindrical portion disposed coaxially with and at a distance from the smaller cylindrical portion and being larger than the smaller cylindrical portion in diameter, and a conical bellows portion connecting the smaller cylindrical portion and the larger cylindrical portion;

wherein the smaller cylindrical portion has a cylindrical surface portion which extends straight in an axial direction, a slant surface portion which extends radially outwardly from the cylindrical surface portion toward the bellows portion in an inclined or curved manner and a vertical wall surface portion which extends radially outwardly from the slant surface portion so as to be perpendicular to the axial direction, the cylindrical surface portion, the slant surface portion and the vertical wall surface portion being formed continuously from a side wall surface of the clamp groove.

In this constant velocity joint boot, the smaller cylindrical portion has a cylindrical surface portion which extends straight in an axial direction, a slant surface portion which extends radially outwardly from the cylindrical surface portion toward the bellows portion in an inclined or curved manner and a vertical wall surface portion which extends radially outwardly from the slant surface portion so as to be perpendicular to the axial direction, the cylindrical surface portion, the slant surface portion and the vertical wall surface portion being formed continuously from a side wall surface of the clamp groove. Since a stress concentration on a specific location on the smaller cylindrical portion can be suppressed by virtue of the stress alleviating action of these cylindrical surface portion, slant surface portion and vertical wall surface portion, the generation of a crack in the smaller cylindrical portion due to stress exerted when the bellows portion bends at small angles can be suppressed effectively.

Namely, when the bellows portion bends at small angles, stress tends to concentrate mainly on the smaller cylindrical portion at the portion thereof which lies near the boundary between the bellows portion and the smaller cylindrical portion and a crack tends to be generated in the smaller cylindrical portion at the relevant portion lying near the boundary. In this respect, in the constant velocity joint boot of the invention, since the vertical wall surface portion is provided near the stress concentrated location where a crack tends to be generated, the concentration of stress can be alleviated by virtue of the increase in surface area.

In addition, in case the bellows portion bends at small angles with a fastening member fastened to the clamp groove, there can be generated a large stress concentration between a portion near the fastening member and the bellows portion. In this respect, in the invention, stress transmitted from the bellows portion to the smaller cylindrical portion is effectively interrupted or absorbed mainly by the vertical wall surface portion and slant surface portion, while stress exerted on the clamp groove side is particularly effectively absorbed by the cylindrical surface portion which extends in the axial direction. Consequently, the vertical wall surface portion, the slant surface portion and the cylindrical surface portion cooperate with each other as a single body to perform an effective stress alleviating action.

Consequently, according to the invention, it is possible to effectively suppress the generation of a crack in the smaller cylindrical portion due to the stress exerted when the bellows portion bends at small angles.

According to a preferred aspect of the invention, if the height of the vertical wall surface portion is represented by the symbol a and a distance from a center axis L of the clamp groove is represented by the symbol D, the relation (1) shown below is met.

$$0.022 \leq a/D \leq 0.145 \tag{1}$$

where the distance D from the center axis L of the clamp groove denotes a distance defined by the outer peripheral surface of the clamp groove and the central axis L of the small cylindrical portion (namely, a value equalizing with a half of an outside diameter of the clamp groove provided on the smaller cylindrical portion) (hereinafter, this will also be true).

In case the height a of the vertical wall surface portion is set within a specific range, it becomes possible to prevent the generation of a crack due to the stress concentration resulting when the bellows portion bends at small angles extremely effectively. In the event that the height a of the vertical wall surface portion is too low and the value of the aforesaid a/D becomes less than 0.022, in particular, 0.015 or smaller, the advantage resulting from the provision of the vertical wall surface portion becomes insufficient. On the other hand, in the event that the height a of the vertical wall surface portion is too high and the value of the aforesaid a/D exceeds 0.145 and becomes, in particular, 0.182 or larger, the rigidity of the vertical wall surface portion becomes too high, and the movement of the bellows portion near the smaller cylindrical portion is disturbed. Due to this, the smooth movement of the bellows portion as a whole is disturbed, and a crack tends to be generated in the bellows portion due to stress concentration.

Furthermore, if the axial length of the cylindrical surface portion is represented by the symbol b and a distance from a center axis L of the clamp groove is represented by the symbol D, the relation (2) shown below is met.

$$0.073 \leq b/D \leq 0.291 \tag{2}$$

In the event that the axial length b of the cylindrical surface portion is too short and the value of the aforesaid b/D becomes less than 0.073, the advantage resulting by the provision of the cylindrical surface portion becomes insufficient. On the other hand, in case the axial length b of the cylindrical surface potion becomes too long and the value of the aforesaid b/D exceeds 0.291, the rigidity of the vertical wall surface portion becomes too high, and the movement of the bellows portion near the smaller cylindrical portion is disturbed. Note that the axial length b of the cylindrical surface portion is preferably in a range from 1 to on the order of 4 mm.

DETAILED DESCRIPTION OF THE PREFERRED EMBODIMENT

Hereinafter, an embodiment of the invention will be described specifically by reference to the drawings.

Embodiment

Figure 1:
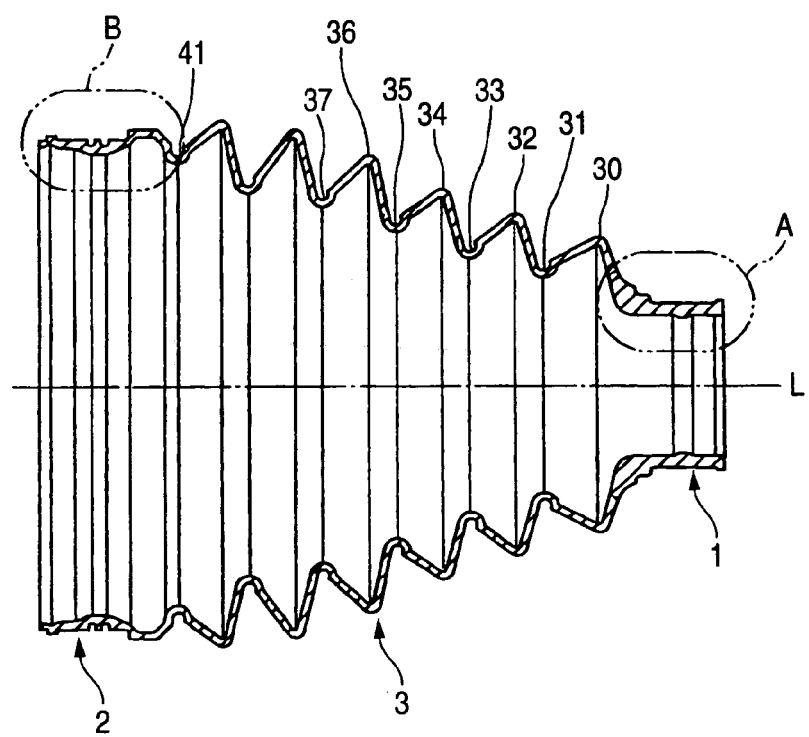
FIG. 1 is a longitudinally vertical sectional view of a constant velocity joint boot according to an embodiment of the invention which is taken along an axis thereof.
Figure 2:
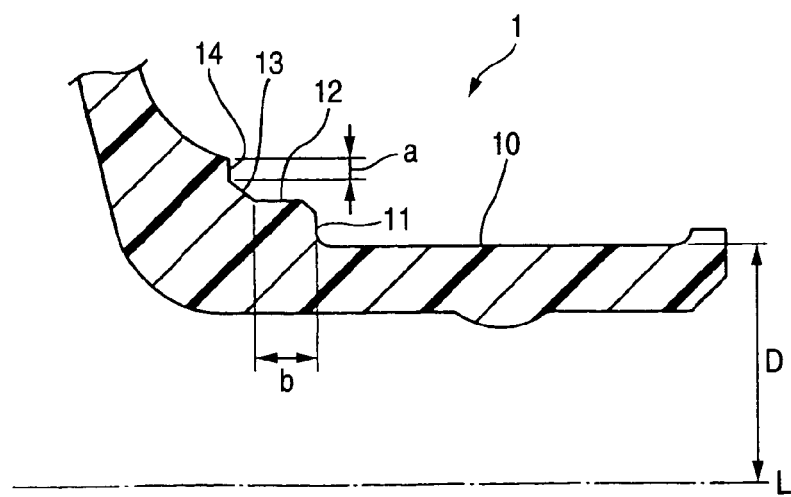
FIG. 2 is an enlarged partial sectional view of a portion of the constant velocity joint boot according to the embodiment which is surrounded by a circle A in FIG. 1.
Figure 3:
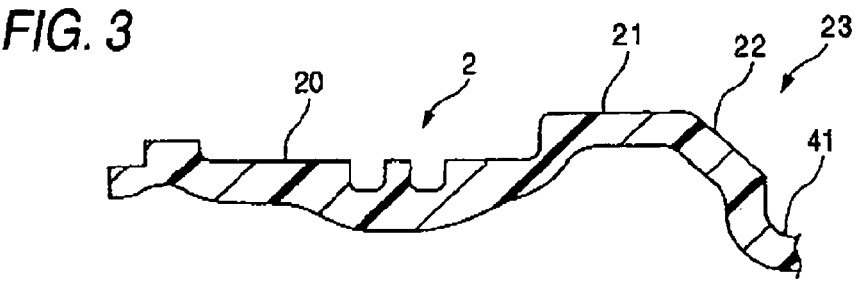
FIG. 3 is an enlarged partial sectional view of a portion of the constant velocity joint boot according to the embodiment which is surrounded by a circle B in FIG. 1.

FIG. 1 shows a longitudinally vertical sectional view of a constant velocity joint boot according to an embodiment of the invention which is taken along an axis thereof, FIG. 2 shows an enlarged partial sectional view of a portion surrounded by a circle A in FIG. 1, and FIG. 3 shows an enlarged partial sectional view of a portion surrounded by a circle B in FIG. 1.

This constant velocity joint boot is made up of a smaller cylindrical portion 1, a larger cylindrical portion 2 that is disposed apart from and concentrically with the smaller cylindrical portion and which has a diameter larger than that of the smaller cylindrical portion, and a bellows portion 3 having a conical overall external which connects together the smaller cylindrical portion 1 and the larger cylindrical portion 2. The larger cylindrical portion 2 and the bellows portion 3 are formed from a thermoplastic elastomer through blow molding, and the smaller cylindrical portion 1 is produced from the thermoplastic elastomer integrally with the bellows portion 3 through injection molding. Note that while thermoplastic ester elastomer (TPEE), thermoplastic olefin (TPO) and the like can be adopted as the thermoplastic elastomer (TPE), TPEE is adopted in this embodiment.

With no load exerted thereon, the smaller cylindrical portion 1, the larger cylindrical portion and the bellows portion 3 are positioned concentrically with each other relative to a central axis L. In addition, in the bellows portion 3, ridge portions and recess portions are formed in an alternate fashion in such a manner that formed sequentially in the following order from a side thereof which lies to face the smaller cylindrical portion 1 are a first ridge portion 30, a first recess portion 31, a second ridge portion 32, a second recess portion 33, a third ridge portion 34, a third recess portion 35, a fourth ridge portion 36, a fourth recess portion 37, . . . .

A clamp groove with which a metallic band or clamp as a fastening member is brought into engagement is formed on an outer peripheral surface of the smaller cylindrical portion 1 (refer to FIG. 2). In addition, the smaller cylindrical portion 1 has a cylindrical surface portion 12 which extends straight in an axial direction, an inclined surface portion 13 which extends, while being inclined, radially outwardly from an end portion of the cylindrical surface portion 12 which lies to face the bellows portion 3 toward the bellow-shaped portion 3 and a vertical wall surface portion 14 which extends radially outwardly in substantially a right-angle direction from an end portion of the inclined surface portion 13 which lies to face the bellows portion 3, the cylindrical surface portion 12, the inclined surface portion 13 and the vertical wall surface portion 14 being formed continuously sequentially in that order from a side wall surface 11 of the clamp groove which lies to face the bellows portion 3 toward the bellows portion 3.

Here, in this embodiment, an axial length b of the cylindrical surface portion 12 is set to be 1.7 mm, an inclined angle of the inclined surface portion 13 relative to the center axis L 45 degrees, the height a of the vertical wall surface portion 14 0.6 mm, a distance D from the center axis L of the clamp groove 10 13.7 mm, respectively. In addition, it is understood that a value of b/D is 0.124, a value of a/D being 0.044.

Note that a clamp groove 20 with which a metallic band or clamp is brought into engagement is also formed on an outer peripheral surface of the larger cylindrical portion 2 (refer to FIG. 3). In addition, a shoulder portion 21 having a cylindrical surface which is in parallel with the center axis L is formed on an end portion of the larger cylindrical portion 2 which lies to face the sixth recess portion 41. In addition, a tapered portion 23 formed into the conical shape and having an inclined surface 22 which inclines from the shoulder portion 21 toward the sixth recess portion 41 is formed at a portion which continues from an end portion of the shoulder portion 21 to the sixth recess portion 41.

In addition, this constant velocity joint boot is securely fitted on a shaft at the smaller cylindrical portion 1 and is securely fitted on a joint outer race at the larger cylindrical portion 2 for use.

COMPARISON EXAMPLE

Figure 4:
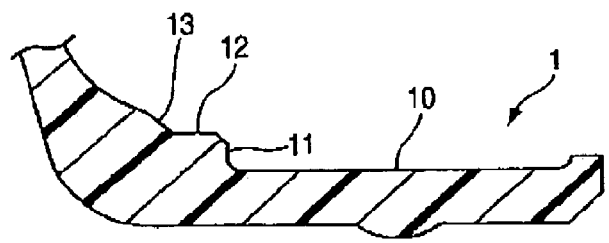
FIG. 4 is a partial sectional view of a constant velocity joint boot of a comparison example.

FIG. 4 shows an enlarged sectional view of a main part of a constant velocity joint boot according to a comparison example. This boot has the same shape as that of the boot of the embodiment and is also produced from the same material as that of the boot of the embodiment, but the vertical wall surface portion 14 is not provided on the boot of the comparison example.

(Evaluation of Stresses Resulting at Small Angles through Finite Element Analysis (FEA))

Simulations were implemented on the constant velocity joint boots of the embodiment and the comparison example through analysis using the final element method or FEA (finite element analysis) for stresses that are to be exerted, respectively, on the smaller cylindrical portion 1 and the bellows portion 3 when the bellows portion 3 bends and deforms so that the joint angle (the angle formed by the joint outer race and the shaft) becomes 20 degrees.

Figure 5:
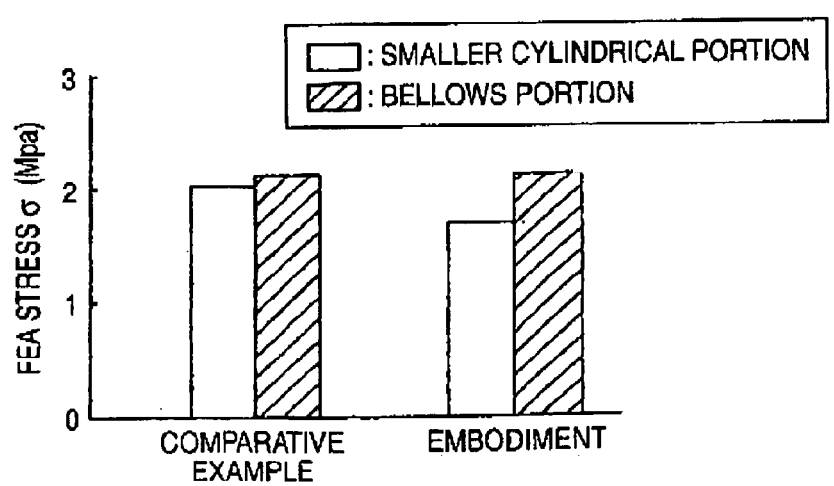
FIG. 5 is a graph which shows the results of evaluations made on the constant velocity joint boots of the embodiment and the comparison example through finite element analysis (FEA) for stresses exerted at small angles.

As is seen from the results thereof shown in FIG. 5, in the embodiment, the stress on the smaller cylindrical portion 1 was reduced by on the order of 20% compared with the stress on the bellows portion 3. On the other hand, in the comparison example, the stress on the smaller cylindrical portion 1 and the stress on the bellows portion 3 were almost the same. It was verified from these facts that the stress exerted on the small cylindrical portion 1 when the bellows portion 3 bends at small angles is reduced by virtue of the existence of the vertical wall surface portion 14.

(Endurance Tests Evaluation)

Endurance tests were carried out on the constant velocity joint boots of the embodiment and the comparison example. The endurance tests were carried out under the following conditions; an atmosphere temperature of 90° C., a joint angle of 20 degrees and a rotational speed of 1300 r.p.m.

Figure 6:
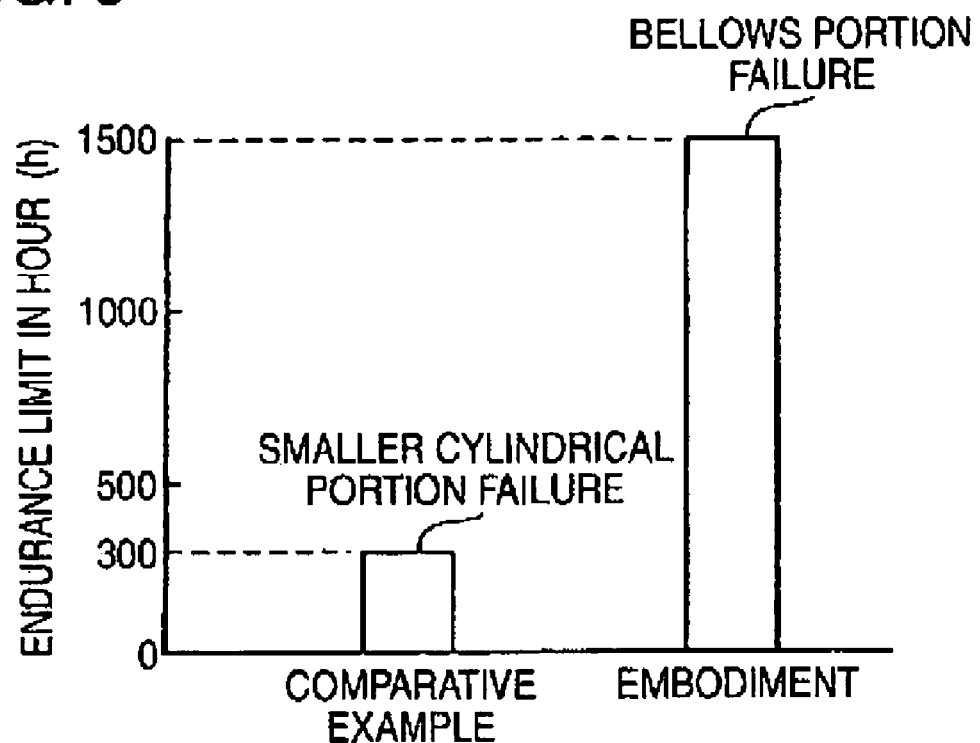
FIG. 6 is a graph which shows the results of endurance tests carried out on the constant velocity joint boots of the embodiment and the comparison example.
Figure 7:
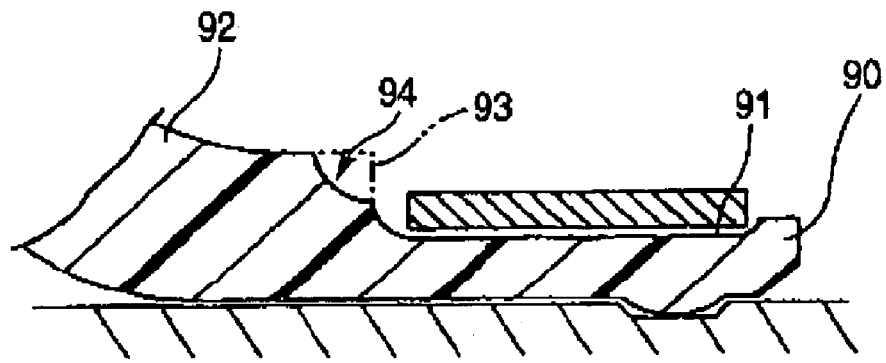
FIG. 7 is a partial sectional view of a conventional constant velocity joint boot.

As is seen from the results thereof shown in FIG. 6, in the embodiment, there occurred a failure at the bellows portion 3 one thousand and five hundred (1500) hours after the initiation of the endurance test, whereas in the comparison example, there occurred a failure at the smaller cylindrical portion 1 three hundred (300) hours after the initiation of the endurance test.

(Evaluation of the Height a of the Vertical Wall Surface Portion)

Endurance tests were carried out under the aforesaid conditions by changing variously the value of a/D in a range from 0.015 to 0.182 by changing variously the height a of the vertical wall surface portion 14 of the embodiment in a range from 0.2 to 2.5 mm. The results thereof is shown in Table 1 below. Note that in Table 1, determinations made on the results are indicated as X for failure at the smaller cylindrical portion 1 irrespective of a target time (280 hours) being cleared and as O when the target time (280 hours) was cleared and a failure occurred at the bellows portion 3.

TABLE 1

| Height a of Vertical Wall Surface | a/D Vale | Endurance Limit in Hour (h) | Failed Location | Evaluation |
| --- | --- | --- | --- | --- |
| 0.2 mm | 0.015 | 300 | small cylindrical portion | X |
| 0.3 mm | 0.022 | 700 | bellows portion | O |
| 0.6 mm | 0.044 | 1500 | bellows portion | O |
| 2.0 mm | 0.145 | 450 | bellows portion | O |
| 2.5 mm | 0.182 | 275 | bellows portion | X |

As is also clear from Table 1, letting the height of the vertical wall surface portion 14 be a and a distance from the center axis L of the clamp groove 10 be D, it is seen that when the height a of the vertical wall surface portion 14 resides within a range from 0.3 to 2.0 mm and the value of a/D within a range from 0.022 to 0.145, the failure at the smaller cylindrical portion 1 can preferably be suppressed in an effective manner. In addition, it is seen that in the event that the height a of the vertical wall surface portion 14 is 0.6 mm and the value of a/D is 0.044, the failure suppressing effect at the smaller cylindrical portion 1 is particularly increased. Due to this, it is seen that it is preferable for the height a of the vertical wall surface portion 14 and the value of a/D to reside within a range that ranges substantially from 0.5 to 1.0 mm and a range that ranges substantially from 0.036 to 0.073, respectively.

Note that in the embodiment, even in the event that a curved surface portion which is curved moderately is used in place of the inclined surface portion 13, it is considered that the same advantage can be obtained.

What is claimed is:

1. A constant velocity joint boot comprising:
   a smaller cylindrical portion attachable to a shaft, which has a clamp groove formed on an outer peripheral surface thereof on which a fastening member is fitted,
   a larger cylindrical portion disposed coaxially with and at a distance from the smaller cylindrical portion and being larger than the smaller cylindrical portion in diameter, and
   a conical bellows portion connecting the smaller cylindrical portion and the larger cylindrical portion, wherein
   the bellows portion has a plurality of ridge portions, wherein a first of the ridge portions is located closer to the smaller cylindrical portion that the other of the ridges;

the smaller cylindrical portion has a cylindrical surface portion, which extends straight in an axial direction, a slant surface portion, which extends radially outwardly from the cylindrical surface portion toward the bellows portion in an inclined or curved manner, and a vertical wall surface portion, which extends radially outwardly from the slant surface portion so as to be perpendicular to the axial direction, the cylindrical surface portion, the slant surface portion and the vertical wall surface portion are formed continuously from a side wall surface of the clamp groove, and the vertical wall surface portion, the slant surface portion, and the cylindrical surface portion are formed in this order at a position spaced apart from the first ridge portion of the bellows portion.

2. A constant velocity joint boot according to claim 1, wherein, the height of the vertical wall surface portion is represented by the symbol a and a distance from a center axis L of the clamp groove is represented by the symbol D, and the following relation (1) below is met;

$$0.022 \leqq a/D \leqq 0.145 \tag{1}.$$

3. A constant velocity joint boot according to claim 1, wherein, an axial length of the cylindrical surface portion is represented by the symbol b and a distance from a center axis L of the clamp groove is represented by the symbol D, and the following relation (2) below is met;

$$0.073 \leqq b/D \leqq 0.291 \tag{2}.$$

* * * * *